United States Patent [19]

Maucher et al.

[11] Patent Number: 4,751,992
[45] Date of Patent: * Jun. 21, 1988

[54] COMPOSITE FLYWHEEL WITH SLIP CLUTCH

[75] Inventors: Paul Maucher, Sasbach; Oswald Friedmann, Lichtenau, both of Fed. Rep. of Germany

[73] Assignee: Luk Lamellen und Kupplungsbau GmbH, Bühl, Fed. Rep. of Germany

[*] Notice: The portion of the term of this patent subsequent to Jul. 21, 2004 has been disclaimed.

[21] Appl. No.: 848,729

[22] Filed: Apr. 4, 1986

[30] Foreign Application Priority Data

Apr. 4, 1985 [DE] Fed. Rep. of Germany ....... 3512372
May 10, 1985 [DE] Fed. Rep. of Germany ....... 3516907
Sep. 7, 1985 [DE] Fed. Rep. of Germany ....... 3532005

[51] Int. Cl.⁴ .............................................. F16D 23/10
[52] U.S. Cl. .................................. 192/103 A; 192/55; 192/70.17; 192/30 V; 192/70.27; 192/109 A
[58] Field of Search ................... 192/106.1, 106.2, 55, 192/70.17, 70.27, 70.23, 70.18, 109 A, 109 B, 103 A, 103 B; 74/574

[56] References Cited

U.S. PATENT DOCUMENTS

| | | | |
|---|---|---|---|
| 2,368,299 | 1/1945 | Hayter | 192/103 A |
| 4,274,524 | 6/1981 | Nakane | 192/48.3 |
| 4,471,863 | 9/1984 | Lech, Jr. | 192/70.17 X |
| 4,586,595 | 5/1986 | Hartig et al. | 192/106.2 |
| 4,596,535 | 6/1986 | Ooga | 192/106.2 X |
| 4,606,451 | 8/1986 | Martinez-Corral et al. | 192/70.17 X |
| 4,611,701 | 9/1986 | Friedmann | 192/70.18 X |

Primary Examiner—Carl D. Friedman
Attorney, Agent, or Firm—Peter K. Kontler

[57] ABSTRACT

The power train between the crankshaft of the internal combustion engine and the input shaft of the change-speed transmission in a motor vehicle has two coaxial flywheels and a two-stage slip clutch between the flywheels. The magnitude of torque which is transmitted by the slip clutch is variable in response to changes in centrifugal force acting upon a diaphragm spring for one stage of the slip clutch. The slip clutch damps and absorbs those peaks of fluctuations of angular displacement of one of the flywheels relative to the other flywheel which are attributable to fluctuations of torque transmitted by the engine.

54 Claims, 3 Drawing Sheets

Fig. 1

COMPOSITE FLYWHEEL WITH SLIP CLUTCH

CROSS-REFERENCE TO RELATED APPLICATION

The apparatus of the present invention is similar to that which is disclosed in our commonly owned co-pending application Ser. No. 848,730 filed Apr. 4, 1986.

BACKGROUND OF THE INVENTION

The invention relates to improvements in torque transmitting assemblies in general, expecially to improvements in assemblies which can be used to transmit torque between the output element of the engine and the input element of the change-speed transmission in a motor vehicle. More particularly, the invention relates to improvements in apparatus for damping angular movements of at least two coaxial flywheels relative to each other.

U.S. Pat. No. 4,274,524 to Nakane discloses a rotational torque transmission mechanism wherein a slip clutch is installed in series with a damper having a set of coil springs and a friction generating device acting in parallel with the springs. Torque which can be transmitted by the slip clutch is constant and exceeds the maximum nominal torque generated by the internal combustion engine which drives one of the flywheels. Consequently, the slip clutch yields and permits the two flywheels to turn relative to each other only when the torque which is transmitted by the engine fluctuates within a very wide range. While the patented mechanism is capable of reducing the strain upon the power train between the engine and the wheels of the motor vehicle, of contributing to the comfort of the occupant or occupants of the vehicle, and of reducing some noise, it fails to operate satisfactorily within the entire RPM range of the engine. One of the reasons is that, as mentioned above, torque which the slip clutch of the patented mechanism can transmit must considerably exceed the nominal torque which is transmitted by the engine. The patented mechanism is designed to account for tolerances in the manufacture of component parts as well as for the fact that torque which is to be transmitted is likely to vary as a result of wear and/or other parameters which change in actual use of the mechanism. Another drawback of the patented mechanism is that it transmits a substantial torque even if the engine is operated at a relatively low RPM, i.e., when the engine does not transmit a maximum torque. Consequently, the mechanism cannot filter out minor fluctuations and/or other variations of torque which is transmitted while the engine is operated at a relatively low RPM.

OBJECTS AND SUMMARY OF THE INVENTION

An object of the invention is to provide a novel and improved apparatus which can damp angular movements of two or more coaxial flywheels or components of one or more flywheels relative to each other and whose ability to damp such movements greatly exceeds that of heretofore known apparatus.

Another object of the invention is to provide a novel and improved slip friction clutch for use in the apparatus.

A further object of the invention is to provide a composite flywheel wherein the angular movements of two or more components of the flywheel relative to each other are damped by the above outlined apparatus.

An additional object of the invention is to provide a simple, compact and inexpensive apparatus which comprises a relatively small number of parts and which can be assembled, at least in part, in automatic machinery.

Still another object of the invention is to provide the apparatus with novel and improved means for modifying the ability of the slip clutch to transmit torque in dependency on parameters which vary under different circumstances of use of the apparatus, such as different rotational speeds of the flywheel or flywheels.

A further object of the invention is to provide an apparatus which can damp vibrations within any desired or necessary portion of the RPM range of the output shaft of the engine in a motor vehicle in which the apparatus is put to use.

An additional object of the invention is to provide an apparatus which can respond to major as well as to minor fluctuations of torque which is transmitted to the driven flywheel or flywheels.

A further object of the invention is to provide a novel and improved multi-stage slip clutch for use in the power train between the internal combustion engine and the change-speed transmission in a motor vehicle.

Another object of the invention is to provide novel and improved flywheels for use in conjunction with the above outlined slip clutch.

The invention is embodied in apparatus for damping angular movements of at least two coaxial flywheels (or coaxial components of a composite flywheel) relative to each other. The apparatus comprises at least one torque-transmitting slip clutch and means (e.g., a diaphragm spring or an electromagnetically operated device) for varying the magnitude of torque which is transmitted by the slip clutch. The slip clutch can be arranged to transmit a predetermined (constant or variable) minimal torque irrespective of rotational speed of the flywheels, and the varying means can include means for changing the magnitude of transmitted torque in response to changes in torque which is transmitted to the driven flywheel.

In accordance with a presently preferred embodiment, the slip clutch comprises several stages. One of the stages can include means for transmitting a substantially constant torque, and another stage can include means for transmitting a variable torque; the altering means then includes means for altering the torque which is transmitted by the other stage. The altering means can include means for altering the torque as a function of changes in rotational speed of that one flywheel which tends to rotate relative to the other flywheel. The arrangement may be such that the magnitude of torque which is transmitted by the other stage in response to increasing rotational speed of the one flywheel increases or decreases.

Each stage can include its own friction generating means and its own energy storing device (particularly a diaphragm spring). One stage can transmit torque ahead of the other stage, and the torque which is transmitted by the one stage can be smaller than that which is transmitted by the other stage. Alternatively, the two stages can transmit substantially identical torques. In many instances, the varying means will be designed to alter the magnitude of torque which is transmitted by one of the stages as a function of variations in the magnitude of centrifugal force acting upon the varying means. The arrangement may be such that the magnitude of transmitted torque increases or decreases in response to increasing centrifugal force. The predetermined minimal torque is or can be transmitted by at least one of the stages in response appropriate initial stressing of a diaphragm spring which acts upon one of the stages. The bias of such spring can be changed in response to variations of centrifugal force in such a way that the bias increases or decreases, i.e., the bias can increase in response to increasing or in response to decreasing centrifugal force.

It has been found that the improved apparatus can be designed as a compact and lightweight unit if it embodies at least two of the following elements (as considered in the axial direction of the flywheels): an axially extending sleeve on one of the flywheels and a first slip clutch stage including a diaphragm spring which reacts against the sleeve; a second slip clutch stage including a disc having a portion forming part of the first stage and being acted upon by tongues which form part of the diaphragm spring; a friction lining forming part of a first stage and being in contact with the disc and a friction lining forming part of the second stage and being in contact with the disc; coaxial and coplanar first and second intermediate discs which respectively form part of the first and second stages; a friction lining forming part of the first stage and contacting the first intermediate disc, and a friction lining forming part of the second stage and contacting the second intermediate disc; a friction surface provided on the one flywheel and forming part of the first stage and a disc member forming part of the second stage and being non-rotatably but axially movably coupled to the one flywheel; a diaphragm spring forming part of the second stage and bearing against the disc member; and a radial flange provided on the one flywheel for the sleeve, the diaphragm spring of the second stage bearing against the flange.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
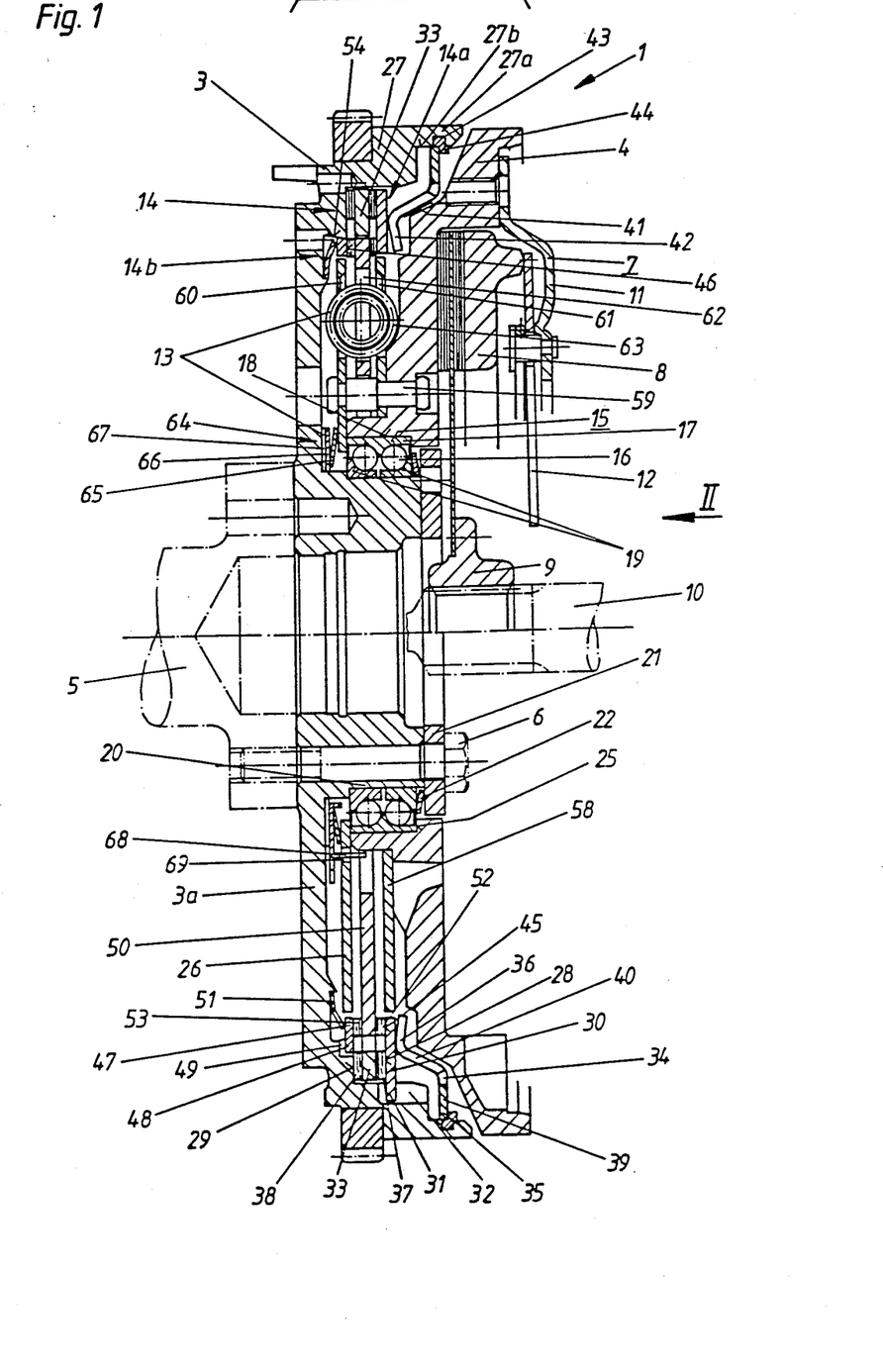
FIG. 1 is an axial sectional view of an apparatus which embodies the invention.
Figure 2:
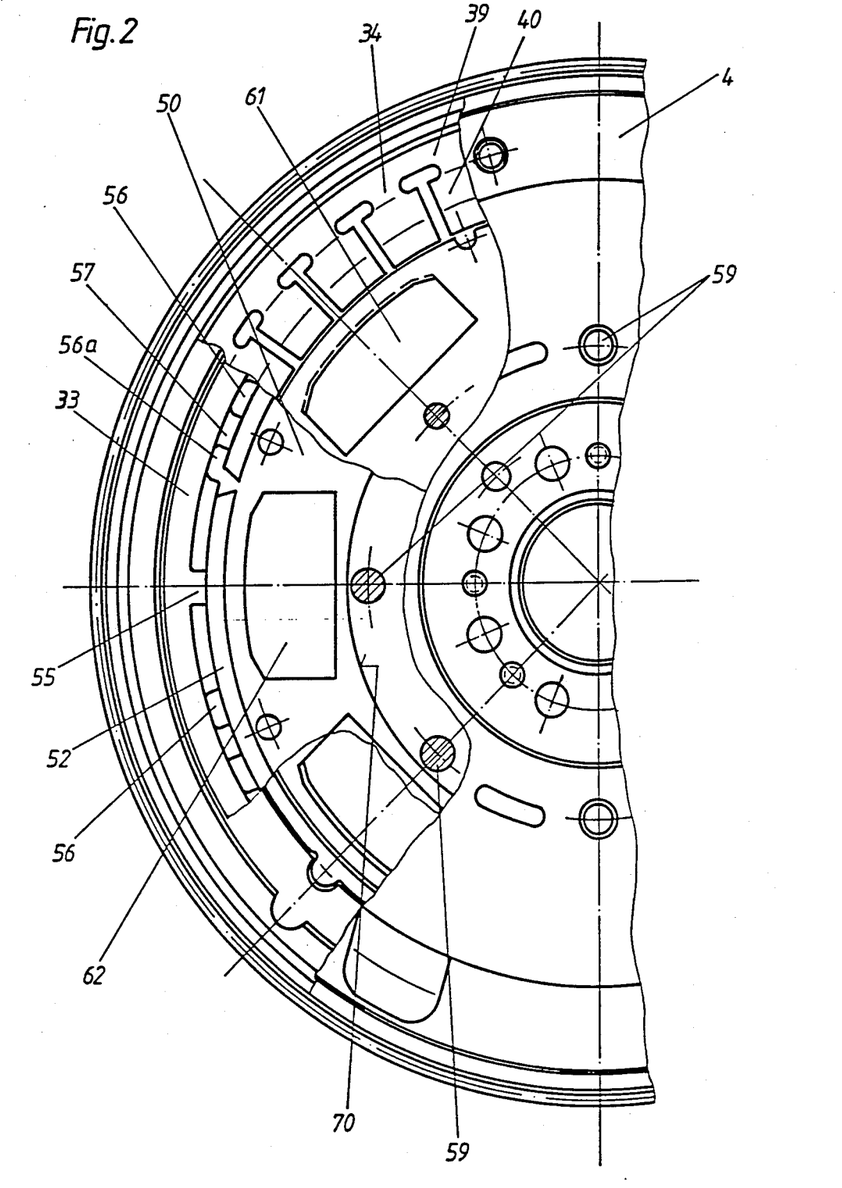
FIG. 2 is a fragmentary elevational view as seen in the direction of arrow II in FIG. 1, with one flywheel partly broken away.

The apparatus 1 which is shown in FIGS. 1 and 2 compensates for variations in torque which is transmitted by the crankshaft 5 of an internal combustion engine to the input shaft 10 of a change-speed transmission (or vice versa) in a motor vehicle. The apparatus comprises a composite flywheel 2 including a first component or flywheel 3 which is secured to the crankshaft 5 by a set of bolts 6 or analogous fasteners, and a second component or flywheel 4 which is coaxial with the component or flywheel 3 and can transmit torque to the input shaft 10 through the medium of a friction clutch 7. The friction clutch 7 comprises a cover or housing 11 which is attached to the component 4 by a set of bolts or other suitable fasteners, a pressure plate 8 which is axially movably installed in the cover 11 and can engage the adjacent friction lining of a clutch disc or clutch plate 9 non-rotatably secured to the input shaft 10, and a diaphragm spring 12 which normally bears against the adjacent projections of the pressure plate 8 and urges the pressure plate 8 against the lining of the clutch disc 9 so that the clutch disc is maintained in torque-receiving frictional engagement with the adjacent friction surface of the component 4. The means for disengaging the clutch 7 is not specifically shown; such means can comprise a bearing which is movable against the tips of radially inwardly extending prongs of the diaphragm spring 12 in the direction of arrow II so as to enable the pressure plate 8 to move axially of and away from the clutch disc 9. This terminates the transmission of torque between the component 4 and the clutch disc 9, i.e., between the crankshaft 5 and the input element 10 of the change-speed transmission. The pressure plate 8 is axially movably secured to the cover 11 by a set of leaf springs (not shown).

The apparatus 1 further comprises an elastic damper 13 and a slip friction clutch 14 (hereinafter slip clutch for short) which is in series with the damper 13 and enables the components 3 and 4 to turn relative to each other when the minimal slip torque is exceeded.

The means for facilitating rotation of the components 3 and 4 relative to each other comprises antifriction bearing means 15 which is installed between the two components. The illustrated antifriction bearing means 15 comprises a radial antifriction ball bearing 16 having an inner race 19, an outer race 17 and two annuli of spherical antifriction rolling elements between the two races. The outer race 17 of the bearing 16 is received in an axial bore 18 of the component 4, and the inner race 19 of the bearing 16 surrounds a centrally located cylindrical protuberance 20 which is an integral part of the component 3 and extends axially in a direction away from the crankshaft 5. The inner race 19 is held against axial movement by a retaining disc 21 which can be secured to the adjacent end face of the protuberance 20 by a set of screws. It is further possible (as actually shown in FIG. 1) to secure the retaining disc 21 to the protuberance 20 by the aforementioned bolts 6 which fix the component 3 to the crankshaft 5 of the internal combustion engine. The inner race 19 is composed of two discrete rings and the right-hand ring of this race 19 is biased toward the left-hand ring by a diaphragm spring 22 which reacts against the retaining disc 21. The left-hand ring of the inner race 19 abuts an external shoulder of the protuberance 20. The outer race 17 of the bearing 16 abuts an internal shoulder 25 of the component 4 under the action of a disc 26 which is secured to the component 4.

The radially outermost portion 27 of the component 3 constitutes an axially extending sleeve which surrounds the damper 13 and the slip clutch 14. The slip clutch 14 is disposed radially outwardly of the damper 13 and comprises two stages or units 14a and 14b which allow the slip clutch to build up the maximum slip torque in stepwise fashion. The unit or stage 14a surrounds the unit or stage 14b and is coaxial therewith. These units are preferably disclosed in a common plane which extends at right angles to the common axis of the components 3 and 4.

The outer unit 14a of the slip clutch 14 has two axially spaced-apart annular friction surfaces 28, 29 which cannot rotate relative to the component 3 of the composite flywheel 2 and receive torque from the crankshaft 5 by way of the component 3. The friction surface 29 is provided directly on the component 3, and the friction surface 28 is provided on a disc 30. The radially outermost portion of the disc 30 has radial projections in the form of teeth 31 which extend into complementary axially extending recesses or grooves 32 machined into or otherwise formed in the internal surface of the sleeve 27. The projections 31 and the surfaces surrounding the recesses 32 cooperate to hold the disc 30 against rotation relative to the radially extending flange 3a of the component 3. However, the just described coupling of the disc 30 to the flange 3a enables the disc 30 to move axially of the component 3. In other words, the friction surface 28 can move axially toward and away from the friction surface 29. The apparatus 1 further comprises an intermediate disc 33 which is installed between the friction surfaces 28 and 29 and is biased axially by a diaphragm spring 34. The radially outermost portion 35 of the diaphragm spring 34 reacts against the sleeve 27 through the medium of a split ring 44, and the radially innermost portion 36 of the diaphragm spring 34 bears against the disc 30 so that the disc 30 maintains its surface 28 in frictional engagement with the adjacent lining 37 on the intermediate disc 33. The intermediate disc 33 further carries a second lining 38 which abuts the friction surface 29 of the component 3. The linings 37, 38 can be bonded or otherwise nonrotatably secured to the intermediate disc 33. However, if the linings 37, 38 are circumferentially complete annuli, they can be loosely inserted between the discs 30, 33 on the one hand and between the disc 33 and the friction surface 29 of the component 3 on the other hand. It is further possible to bond the lining 37 to the surface 28 (the left-hand surface of the friction lining 37 then constitutes one friction surface of the unit 14a) and to bond the friction lining 38 to the surface 29 (one surface of the lining 38 then constitutes the other friction surface of the unit 14a).

The diaphragm spring 34 is installed in prestressed condition and its circumferentially complete outer marginal portion 39 abuts the aforementioned split ring 44 which is recessed into a groove 43 in the internal surface 27b of the end portion 27a of the sleeve 27. The arrangement is preferably such that the split ring 44 surrounds a portion of the periphery as well as a portion of the right-hand side of the diaphragm spring 34, as viewed in FIG. 1. This ensures that the split ring 44 cannot accidentally leave its groove 43. The circumferentially complete outer marginal portion 39 of the diaphragm spring 34 carries substantially radially inwardly extending tongues 40 each of which is bent in a manner as shown in the upper and lower portions of FIG. 1. Thus, the radially outermost portions 41 of the tongues 40 are bent in a direction toward the disc 30 and the radially innermost portions 42 of such tongues are inclined relative to the portions 41 so that the junctions between the portions 41, 42 abut the adjacent surface of the disc 30. The radially innermost portion 36 of the diaphragm spring 34 is defined by the aforementioned junctions.

The second or inner unit or stage 14b of the slip clutch 14 operates between the first unit or stage 14a and the damper 13. It has two axially spaced-apart annular friction surfaces 45, 46 which cannot rotate relative to the component 3 and are designed to transmit to the damper 13 at least some of the torque which is generated by the internal combustion engine. In the illustrated embodiment, the friction surface 45 is formed on the radially innermost portion of the disc 30, i.e., the disc 30 forms part of both units 14a, 14b in that its radially outermost portion defines the aforediscussed friction surface 28 of the unit 14a. The friction surface 46 of the unit 14b is provide on a disc 47, the radially outermost portion of which has projections in the form of teeth 48 extending radially of the common axis of the components 3, 4 and received in complementary internal recesses or tooth spaces 49 of the component 3. This ensures that the disc 47 cannot rotate relative to the component 3. However, the configuration of teeth 48 and tooth spaces 49 is such that the disc 47 can move axially of the component 3, i.e., the friction surface 46 can move toward and away from the friction surface 45.

The unit or stage 14b of the slip clutch 14 further comprises an intermediate disc 50 which is interposed between the friction surfaces 45, 46 and is biased by a diaphragm spring 51. The arrangement is such that the radially innermost portion of the diaphragm spring 51 reacts against the radial flange 3a of the component 3 and its radially outermost portion or portions bear against the disc 47 so as to urge the friction surface 46 axially toward the friction surface 45. Friction linings 52, 53 are provided on and can be bonded to the intermediate disc 50. Alternatively, the linings 52, 53 can constitute circumferentially complete rings which are loosely inserted between the intermediate disc 50 and the flange 3a on the one hand, and between the intermediate disc 50 and the disc 30 on the other hand. Still further, the linings 52, 53 can be respectively bonded to the friction surfaces 45, 46. The function of the friction surface 45 is then performed by one surface of the lining 52, and the function of the friction surface 46 is performed by one surface of the lining 53. Such transposed friction surfaces are caused to contact the respective sides of the intermediate disc 50 when the unit 14b of the slip clutch 14 is in use.

As can be seen in FIG. 1, the friction surfaces 28, 45 are disposed in a common plane which is normal to the axis of the components 3, 4, and the friction surfaces 29, 46 are disposed in a second plane which is parallel to the first plane. The disc 47 and the diaphragm spring 51 of the second unit 14b are accommodated in a circular recess 54 which is provided in the component 3 radially inwardly of the friction surface 29.

The diaphragm springs 34, 51 (which respectively form part of the units 14a and 14b) are axially stressed in such a way that axial forces which are generated thereby act in opposite directions. In other words, the diaphragm spring 34 opposes a return of the diaphragm spring 51 to unstressed condition and vice versa. Axial stressing of the diaphragm spring 34 is more pronounced than that of the diaphragm spring 51, i.e., the bias of the spring 34 on other parts of the unit 14a is more pronounced than the bias of the spring 51 upon other parts of the unit 14b. This ensures that the unit 14a is axially stressed even when the rotational speed of the engine is very low. In other words, the first unit 14a of the slip clutch 14 will operate even at a very low rotational speed of the engine.

The intermediate discs 33 and 50 have a limited freedom of angular movement relative to each other. To this end, the intermediate disc 33 is formed with radially inwardly extending projections in the form of teeth 55 (see FIG. 2) which are received with angular play between projections or abutments 56, 56a provided at the periphery of the disc 50. In the embodiment which is shown in FIGS. 1 and 2, the intermediate discs 33 and 50 have freedom of movement relative to each other through an angle of approximately 25 degrees. FIG. 2 further shows that the abutments 56 (which are engaged by the teeth 55 when the intermediate disc 33 turns in a clockwise direction) are not the same as the abutments (56) which are contacted by the projections 55 when the disc 33 is caused to turn in the opposite direction. This is desirable and advantageous because such construction renders it possible to make the intermediate discs 33 and 50 in a single operation. All that is necessary is to stamp the projections 55 of the outer intermediate disc 33 between the neighboring projections 56a, 56 of the inner intermediate disc 50. Such stamping results in the formation of relatively narrow clearances 57 which are provided between neighboring teeth 56, 56a.

The intermediate disc 50 constitutes the output element of the slip clutch 14 and of its unit 14b as well as a flange-like input element of the damper 13. The damper further comprises a pair of discs 26, 58 which are disposed at the opposite sides of the intermediate disc 50 and are held at a fixed distance from each other by distancing elements 59 in the form of rivets anchored in the component 4 of the composite flywheel 2. The discs 26 and 58, as well as those portions of the intermediate disc 50 which are disposed therebetween, are formed with openings in the form of windows 60, 61 and 62 for energy storing elements in the form of coil springs 63. The coil springs 63 yieldably oppose angular movements of the intermediate disc 50 and discs 26, 58 relative to each other.

The space between the components 3 and 4 further accommodates a friction generating device 64 which forms part of the elastic damper 13 and operates in parallel with the coil springs 63. The friction generating device 64 surrounds the protuberance 20 of the component 3 and is disposed axially between the disc 26 and the radially extending flange 3a of the component 3. It comprises a diaphragm spring 65 which is axially stressed between the disc 26 and a pressure transmitting ring 66. A friction ring 67 is disposed axially between the ring 66 and the flange 3a of the component 3. The pressure transmitting ring 66 has a radially outermost portion which is provided with axially extending projections in the form of arms or teeth 68 extending through complementary cutouts or tooth spaces 69 of the disc 26 in the axial direction of the components 3 and 4. This ensures that the ring 66 is held against angular movement relative to the disc 26.

As can be seen in FIG. 2, the distancing elements 59 extend axially through a central opening 70 of the intermediate disc 50. The limits upon the operation of the damping means 13 are imposed by the coil springs 63. Thus, the damping means 13 becomes inoperative when at least one of the coil springs 63 is fully compressed so that it actually constitutes a solid (non-compressible) block.

The mode of operation of the improved apparatus 1 will be described with reference to the diagram of FIG. 3. The angular displacements of the components or flywheels 3 and 4 relative to each other are measured (in degrees) along the abscissa, and the torque M which is transmitted by the slip clutch 14 and damper 13 is measured along the ordinate. Torque which is transmitted by the slip clutch 14 varies in dependency on fluctuations of the centrifugal force, i.e., in dependency on the rotational speed of the crankshaft 5 of the internal combustion engine. This is due to the fact that the outer unit or stage 14a of the slip clutch 14 comprises the aforediscussed bent tongues 40 which tend to undergo deformation (by tending to move radially outwardly) in response to increasing rotational speed of the crankshaft 5 whereby their innermost portions 42 bear with a greater force against the adjacent disc 30, i.e., the friction surface 28 is urged with a greater force against the adjacent lining 37 and the lining 38 bears with a greater force against the friction surface 29 of the component 3. It is assumed that the projections 55 of the intermediate disc 33 engage the abutments 56a or 56 of the intermediate disc 50 when the angular displacement of one of the components 3, 4 relative to the other component begins. In other words, the components 3 and 4 are capable of performing a maximum angular movement relative to each other.

If one of the components 3, 4 starts to turn relative to the other so that it leaves the starting or idle position 71 (note the diagram of FIG. 3), at least some of the coil springs 63 of the damper 13 are compressed during the first stage of such angular movement until the moment which is generated by the springs 63 can overcome the slip torque of the unit 14b of the slip clutch 14. This takes place when the component 3 or 4 completes an angle 72 by turning in a direction away from its starting position 71. If the angular displacement of the component 3 or 4 in the same direction continues, the unit 14b of the slip clutch 14 slips until the projections 55 reach the abutments 56 or 56a. The angle during which the unit 14b of the slip clutch 14 is effective is indicated at 73. Such angle can be varied within a wide range, depending on the requirements and intended use of the apparatus 1 and/or of the vehicle which embodies the apparatus. In most instances, the angle 73 is between 10 and 120 degrees. As mentioned above, the angle 73 in the embodiment of FIGS. 1 and 2 is approximately 25 degrees.

If the component 3 or 4 continues to turn in the same direction so as to cover an angle which exceeds the sum of the angles 72 and 73, the higher frictional torque of the unit 14a of the slip clutch 14 entails a further compression of the coil springs 63 while the component 3 or 4 turns through an additional angle 74 until at least one of the coil springs 63 is fully compressed so that it cannot undergo any additional deformation (the convolutions of such one coil spring then abut each other and together form a solid block). At such time, the damper 13 cannot permit additional angular movements of the components 3 and 4 relative to each other. Any additional angular displacement of the components 3 and 4 relative to each other is possible only if the torque which the internal combustion engine transmits to the component 3 (for example, as a result of pronounced peaks due to non-uniform generation of torque) exceeds the torque which can be transmitted by the unit 14a of the slip clutch 14. Such torque depends on the rotational speed of the engine and is denoted in FIG. 3 at 75.

Figure 3:
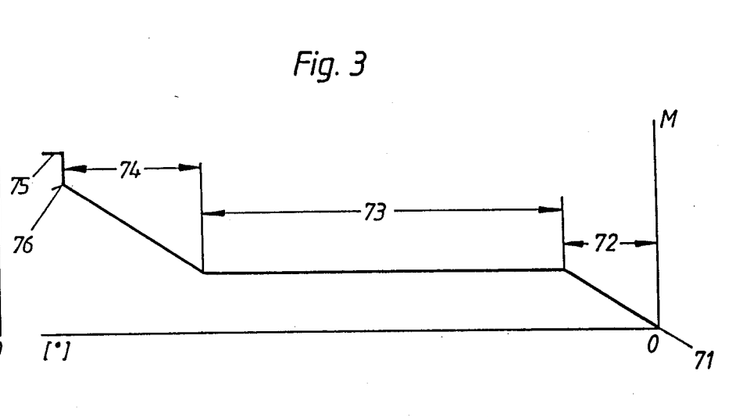
FIG. 3 is a diagram wherein the angular displacement of the flywheels relative to each other is measured along the abscissa and the magnitude of torque is measured along the ordinate.

In the curve of the diagram which is shown in FIG. 3, slip torque 75 of the unit 14a exceeds the torque 76 at which the coil spring or coil springs 63 of the damping means 13 are fully compressed.

It may be advisable (under certain circumstances) that, up to a given RPM of the engine, torque which can be transmitted by the unit 14a be smaller than that torque at which the spring or springs 63 of the damper 13 undergo complete compression (maximum deformation). When the torque which can be transmitted by the unit 14a is exceeded, the components 3 and 4 of the composite flywheel 2 can rotate relative to each other through any desired angle, i.e., there is no further barrier to additional angular displacement of such components relative to each other.

In the embodiment of FIGS. 1 to 3, slip torque 75 of the unit 14a of the slip clutch 14 corresponds to the smallest torque that is transmitted by the unit 14a, namely the unit 14a can transmit the torque 75 even if the rotational speed of the engine shaft is reduced to zero.

Figure 4:
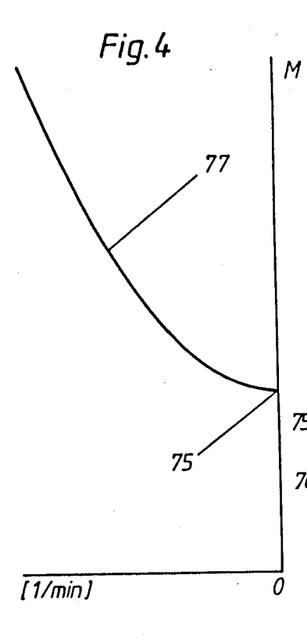
FIG. 4 is a diagram wherein the rotational speed of the engine is measured along the abscissa and the torque which is transmitted by the slip clutch is measured along the ordinate.

In the diagram of FIG. 4, the RPM of the internal combustion engine is measured along the abscissa and the torque M which can be transmitted by the unit 14a of the slip clutch 14 is measured along the ordinate. As already explained, the slip clutch 14 can transmit a minimal torque 75 when the engine is idle because the diaphragm spring 34 is installed in prestressed condition. Due to axial displacement of portions 41 and 42 of the tongues 40 of the diaphragm spring 34 relative to each other and to the marginal portion 39 of such diaphragm spring, the portions 41, 42 tend to transmit a moment to the marginal portion 39 as a result of the action of centrifugal force when the engine drives the crankshaft 5. However, since the tongues 40 bear against the disc 30 in the axial direction of the flywheel 2, such moment is intercepted whereby the spring 34 transmits an axially oriented force to the adjacent disc 30. This force increases with increasing rotational speed of the engine as indicated by the curve 77 in the diagram of FIG. 4. The curve 77 is or resembles a porabola. The tongues 40 of the diaphragm spring 34 are preferably designed and configured in such a way that each portion of the curve 77 denoting the torque which is transmitted by the unit 14a of the slip clutch 14 invariably exceeds the torque which is transmitted by the internal combustion engine. In other words, torque which can be transmitted by the slip clutch 14 is invariably greater than that torque which is transmitted by the engine, irrespective of the rotational speed of the crankshaft 5.

In order to take into consideration the manufacturing tolerances, deviations of the friction coefficient from the desired value as well as the wear upon the slip clutch, especially upon the linings 37 and 38, the slip clutch 14 is preferably designed in such a way that torque which can be transmitted by the slip clutch when the engine is idle exceeds the nominal torque of the internal combustion engine. In the embodiment which is shown in FIGS. 1 and 2, torque which is transmitted by the slip clutch 14 while the vehicle operates normally (the engine drives the input shaft 10 of the change-speed transmission) is at least substantially identical with that torque which is transmitted by the slip clutch 14 when the vehicle is coasting.

The units 14a, 14b of the slip clutch 14 are arranged in series with each other as well as with the damper 13.

It will be seen that the invention is embodied in an apparatus 1 for damping angular movements of at least two coaxial flywheels (3, 4) relative to each other. The apparatus comprises at least one torque-transmitting slip clutch 14 and means (34) for varying the magnitude of torque which is transmitted by the slip clutch. Such adjustability of torque which can be transmitted by the slip clutch 14 renders it possible to ideally conform the operation of the apparatus 1 to the specific circumstances of use, e.g., in the power train of a motor vehicle. For example, the arrangement may be such that the apparatus can absorb, at least within certain portions of the full RPM range of an internal combustion engine, those fluctuations of transmitted torque which are below the nominal torque of the engine. Furthermore, the improved apparatus renders it possible to transmit a small torque at a relatively low RPM of the engine and a torque whose magnitude increases with increasing RPM of the engine.

An important advantage of the improved apparatus is that it can be designed to vary the torque which can be transmitted by the slip clutch 14 in dependency on the magnitude of torque which is transmitted by the engine and that a predetermined minimal torque (75) can be transmitted by the slip clutch under all circumstances. The minimal torque can be constant or variable. Such design of the apparatus renders it possible to vary the torque which can be transmitted by the slip clutch 14 in dependency on the torque which is generated by the engine and/or in dependency on the increasing or decreasing (varying) moment of the engine. The above outlined construction renders it further possible to alter the torque which is transmitted by the slip clutch 14 in dependency on the actually developing existing moment. Such conformance and variation of torque which is transmitted by the slip clutch can take place stepwise or gradually.

The provision of a slip clutch 14 with several stages contributes to versatility of the improved apparatus 1. It is often desirable to design one of the stages in such a way that it transmits torque which is at least substantially constant and to design at least one other stage in such a way that it can transmit a variable torque. The arrangement is preferably such (as already described above), that the other stage varies the transmitted torque in dependency on the RPM of that one flywheel which tends to rotate relative to the other flywheel. As described in connection with FIGS. 1 and 2, the arrangement may be such that the magnitude of torque which can be transmitted by the adjustable stage increases with increasing RPM. However, the configuration of tongues 40 on the diaphragm spring 34 can be readily selected in such a way that the magnitude of torque which is transmitted by the stage 14a decreases in response to increasing RPM.

The diaphragm spring 34 forms part of the stage 14a and also constitutes the means for varying the magnitude of torque which can be transmitted by the slip clutch 14. The illustrated slip clutch 14 comprises two diaphragm springs 34 and 51, one for each of the two stages. This enables each stage to generate the respective frictional or slip torque. The torque which is transmitted by one of the stages may but need not be identical with the torque which is transmitted by the other stage. The arrangement is preferably such that the stage (14b) which is effective ahead of the other stage transmits a smaller torque. However, it is equally within the purview of the invention to design the apparatus in such a way that the magnitude of torque which is transmitted by the stage 14b matches that which is transmitted by the stage 14a.

The arrangement may be such that the magnitude of variable torque which can be transmitted by the slip clutch 14 depends on the extent of angular displacement of the flywheels or components 3, 4 relative to each other. If the magnitude of transmitted torque varies in dependency on variations of centrifugal force, the arrangement may be such that the magnitude of transmittable torque increases with increasing RPM. The arrangement is particularly advantageous if the slip clutch can transmit a minimal (fixed or variable) torque irrespective of the magnitude of centrifugal force. The variable torque is superimposed upon such minimal torque.

As mentioned above, the configuration of tongues 40 on the diaphragm spring 34 of the means for varying the magnitude of torque which can be transmitted by the slip clutch 14 can be selected in such a way that the force with which the tongues bear upon the disc 30 decreases in response to increasing RPM and hence in response to increasing centrifugal force. This will be readily understood by artisans having the required skill in the art. As explained above, the extent to which the diaphragm spring 34 is stressed when the flywheel 2 is not in rotary motion determines the magnitude of minimal torque which can be transmitted by the slip clutch 14.

It is further within the scope of the invention to mount the stages 14a, 14b of the slip clutch 14 next to each other in the axial direction of the composite flywheel 2.

It has been found that the improved apparatus will operate highly satisfactorily if the slip torque of the stage 14b is between 50 and 250 Nm and the slip torque is between 80 and 800 Nm when the stage 14a is effective.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for damping angular movements of at least two flywheels, comprising at least one torque-transmitting slip clutch which is operative to oppose angular movements of the flywheels relative to each other, and means for varying the magnitude of torque which is transmitted by said clutch, said clutch comprising a plurality of stages and at least one of said stages including means for transmitting a variable torque.

2. The apparatus of claim 1, wherein said varying means includes means for varying the magnitude of transmitted torque in dependency on the variations of torque which is transmitted by a prime mover to one of the flywheels.

3. The apparatus of claim 1, wherein each of said stages comprises discrete friction generating means.

4. The apparatus of claim 3, wherein at least one of said discrete friction generating means comprises an energy storing device.

5. The apparatus of claim 1, wherein a selected one of said stages includes means for transmitting a first torque and another of said stages includes means for transmitting a different second torque.

6. The apparatus of claim 5, wherein said selected stage is arranged to transmit torque ahead of said other stage and said first torque is smaller than said second torque.

7. The apparatus of claim 1, wherein said stages include two stages arranged to transmit substantially identical torques.

8. The apparatus of claim 1, wherein said varying means includes means for varying the magnitude of torque which is transmitted by a selected one of said stages as a function of the magnitude of centrifugal force acting upon said varying means.

9. The apparatus of claim 8, wherein said varying means includes means for increasing the magnitude of torque which is transmitted by said selected stage in response to increasing rotational speed.

10. The apparatus of claim 8, wherein said selected stage includes means for transmitting a predetermined minimal torque.

11. The apparatus of claim 1, wherein said varying means includes a prestressed diaphragm spring which is arranged to act upon a selected one of said stages with a force whose magnitude is a function of the magnitude of centrifugal force acting upon said spring.

12. The apparatus of claim 11, wherein said spring is arranged to bias said selected stage with a force whose magnitude increases in response to increasing rotational speed.

13. The apparatus of claim 11, wherein said spring is arranged to bias said selected stage with a force whose magnitude decreases in response to decreasing rotational speed.

14. The apparatus of claim 11, wherein said diaphragm spring includes a first annular portion and a second annular portion which is axially offset relative to said first annular portion and bears upon said selected stage with a force whose magnitude is a function of the magnitude of centrifugal force acting upon said second annular portion.

15. The apparatus of claim 14, wherein said first annular portion is a circumferentially complete annulus and said second annular portion includes a plurality of tongues.

16. The apparatus of claim 1, wherein one of said stages is nearer to the axes of said flywheels than another of said stages.

17. The apparatus of claim 1, wherein one of said stages is adjacent to another of said stages in the axial direction of said flywheels.

18. The apparatus of claim 1, further comprising damper means interposed between at least one of said stages and at least one of said flywheels.

19. The apparatus of claim 1, a wherein a selected one of said stages is nearer to the common axis of said flywheels than another of said stages, said varying means including means for varying the torque which is transmitted by said other stage as a function of the magnitude of centrifugal force acting upon said varying means, said selected stage having means for transmitting a substantially constant torque.

20. The apparatus of claim 1, wherein stages include a first and a second stage and each of said first and second stages comprises at least two axially spaced-apart annular friction surfaces and an intermediate disc disposed between the respective friction surfaces, at least one friction surface of each of said first and second stages being provided on one of said flywheels.

21. The apparatus of claim 20, wherein at least one of said discs has friction linings in engagement with the respective friction surfaces.

22. The apparatus of claim 20, wherein said discs are disposed in a common plane.

23. The apparatus of claim 20, wherein one of said discs is nearer to the axes of said flywheels than the other of said discs.

24. The apparatus of claim 20, wherein one of said discs is disposed radially outwardly of the other of said discs and said discs are angularly movable within limits relative to each other, said one disc being rotatable relative to one of said flywheels through any selected angle when the magnitude of torque which is transmitted by the stage including said one disc is exceeded.

25. The apparatus of claim 24, further including elastic damper means interposed between the stage including said other disc and the other of said flywheels.

26. The apparatus of claim 25, wherein at least a portion of said damper means is disposed radially inwardly of said clutch.

27. The apparatus of claim 24, wherein said one disc has at least one substantially radially inwardly extending projection and said other disc has two substantially radially outwardly extending abutments flanking said projection in the circumferential direction of said discs with a predetermined clearance.

28. The apparatus of claim 20, wherein the disc of said first stage is more distant from the axes of said flywheels than the disc of said second stage, said first stage further including two friction linings defining the respective friction surfaces, said first stage further comprising an additional disc and said first stage further comprising means for axially movably coupling said additional disc to said one flywheel so that said additional disc shares the angular movements of said one flywheel.

29. The apparatus of claim 28, wherein said varying means includes a diaphragm spring having a first annular portion reacting against said one flywheel and a second annular portion bearing against said additional disc to urge said additional disc toward the respective intermediate disc.

30. The apparatus of claim 29, wherein said first annular portion is a circumferentially complete annular portion and said second annular portion comprises a plurality of tongues extending from said first annular portion toward the common axis of said flywheels, said tongues including portions which are axially offset with reference to said first annular portion.

31. The apparatus of claim 30, wherein said one flywheel has a sleeve surrounding said diaphragm spring, said first annular portion reacting against said sleeve.

32. The apparatus of claim 31, wherein said sleeve comprises a ring and said first annular portion abuts said ring.

33. The apparatus of claim 1, wherein said stages include a first stage and a second stage which is nearer to the axes of said flywheels than said first stage, said second stage including first and second discs arranged to rotate with one of said flywheels, an intermediate disc between said discs, a first friction lining between said first disc and said intermediate disc, and a second friction lining between said second disc and said intermediate disc.

34. The apparatus of claim 33, wherein one of said first and second discs is movable axially toward and away from the other of said first and second discs, said second stage further comprising means for biasing said one disc axially toward said intermediate disc.

35. The apparatus of claim 34, wherein said biasing means includes a diaphragm spring which reacts against said one flywheel.

36. The apparatus of claim 33, wherein said first stage includes a portion of said other disc.

37. The apparatus of claim 36, wherein said varying means includes a diaphragm spring bearing against said other disc.

38. The apparatus of claim 1, wherein said stages include a first and a second stage, said first and second stages respective comprising first and second diaphragm springs, said diaphragm springs reacting against one of said flywheels so that one of said springs stresses the other and vice versa.

39. The apparatus of claim 38, wherein said second stage is disposed radially inwardly of said first stage and the bias of said first spring exceeds the bias of said second spring.

40. The apparatus of claim 1, wherein said stages include a first stage nearer to and a second stage more distant from the common axis of said flywheels, one of said flywheels having a radial flange and a sleeve provided on said flange and surrounding said second stage, said second stage comprising a first diaphragm spring which reacts against said sleeve and said second stage comprising a second diaphragm spring which reacts against said flange, said first stage further comprising at least one element which is biased by said first spring and said second stage further comprisng at least one element which is biased by said second spring.

41. The apparatus of claim 1, wherein one of said flywheels is arranged to receive torque from the internal combustion engine of a motor vehicle and the other of said flywheels is arranged to transmit torque to the input element of a change-speed transmission of the vehicle, said slip clutch being mounted on said one flywheel and further comprising elastic damper means interposed between said slip clutch and said other flywheel.

42. The apparatus of claim 41, further comprising a friction clutch interposed between said other flywheel and the input element of the transmission.

43. The apparatus of claim 1, wherein said stages include a first stage arranged to transmit torque in the range of 50-250 Nm and a second stage arranged to transmit torque in the range of 80-800 Nm.

44. The apparatus of claim 1, wherein said stages are connected in series.

45. The apparatus of claim 1, further comprising at least one damper in series with at least one of said stages.

46. The apparatus of claim 45, wherein said stages are connected in series.

47. The apparatus of claim 1, comprising in the axial direction of said flywheels:
(a) an axially extending sleeve on one of said flywheels and a first slip clutch stage including a diaphragm spring reacting against said sleeve,
(b) a second slip clutch stage includin.g a disc having a portion forming part of the first stage, said spring having tongues bearing against said disc,
(c) a friction lining forming part of said first stage and in contact with said disc, and a friction lining forming part of said second stage and contacting said disc, (d) coaxial and coplanar first and second intermediate discs respectively forming part of said first and second stages, (e) a friction lining forming part of said first stage and contacting said first intermediate disc and a friction lining forming part of said second stage and contacting said second intermediate disc, (f) a friction surface provided on the one flywheel and forming part of the first stage and a disc member forming part of the second stage and being non-rotatably but axially movably coupled to the one flywheel, (g) a diaphragm spring forming part of the second stage and bearing against the disc member, and (h) a radial flange provided on the one flywheel for said sleeve, the diaphragm spring of said second stage bearing against said flange.

48. The apparatus of claim 1, further comprising at least one antifriction bearing interposed between the flywheels radially inwardly of said slip clutch.

49. The appartus of claim 1, wherein said varying means includes means for varying the magnitude of transmitted torque in dependency on the variations of torque which is transmitted by a prime mover to one of the flywheels and in dependency on variations in the magnitude of torque which is transmitted by one of said flywheels to another of said flywheels.

50. The apparatus of claim 1, wherein said varying means includes means for varying the magnitude of transmitted torque in dependency on the variations in the magnitude of torque which is transmitted by one of said flywheels to another of said flywheels.

51. Apparatus for damping angular movements of at least two flywheels, comprising at least one torque-transmitting slip clutch which is operative to oppose angular movements of the flywheels relative to each other, and means for varying the magnitude of torque which is transmitted by said clutch, said clutch comprising a plurality of stages and one of said stages including means for transmitting a substantially constant torque, another of said stages including means for transmitting a variable torque which is transmitted by said other stage.

52. The apparatus of claim 51, wherein said altering means includes means for altering the torque as a function of changes in rotational speed of one of the flywheels.

53. The apparatus of claim 52, wherein said altering means includes means for increasing the magnitude of torque which is transmitted by said other stage in response to increasing rotational speed of said one flywheel.

54. The apparatus of claim 52, wherein said altering means includes means for reducing the magnitude of torque which is transmitted by said other stage in response to increasing rotational speed of said one flywheel.

* * * * *